United States Patent [19]

Hatfield et al.

[11] Patent Number: 5,401,455

[45] Date of Patent: Mar. 28, 1995

[54] METHOD FOR PACKAGING HOT MELT ADHESIVES

[75] Inventors: Stephen Hatfield, Somerville; Paul Puletti, Pittstown; Robert Giese, Wall; Roger Thorpe, Skillman, all of N.J.

[73] Assignee: National Starch and Chemical Investment Holding Corporation, Wilmington, Del.

[21] Appl. No.: 295,972

[22] Filed: Aug. 25, 1994

Related U.S. Application Data

[63] Continuation of Ser. No. 883,994, May 18, 1992, abandoned.

[51] Int. Cl.⁶ .............................................. B29C 39/10
[52] U.S. Cl. .................... 264/255; 264/266; 264/268; 264/338
[58] Field of Search .............. 264/255, 257, 259, 266, 264/267, 268, 337, 338, 348; 156/227

[56] References Cited

U.S. PATENT DOCUMENTS

| | | | |
|---|---|---|---|
| 2,639,808 | 5/1953 | Barry et al. | |
| 2,762,504 | 9/1956 | Sparks et al. | 206/84 |
| 3,314,536 | 4/1967 | Janota et al. | 206/84 |
| 3,469,363 | 9/1969 | Berckmoes | 53/25 |
| 3,564,808 | 2/1971 | Kent | 53/25 |
| 4,054,632 | 10/1977 | Franka | 264/145 |
| 4,106,261 | 8/1978 | Greenawalt | 53/17 |
| 4,137,692 | 2/1979 | Levy | 53/440 |
| 4,229,872 | 10/1980 | Rozmus | 29/420 |
| 4,275,864 | 6/1981 | Richards | 264/348 |
| 4,306,657 | 12/1981 | Levy | 206/447 |
| 4,334,615 | 6/1982 | Butler et al. | 206/447 |
| 4,450,878 | 5/1984 | Takada et al. | 141/48 |
| 4,681,712 | 7/1987 | Sakakibara et al. | 264/338 |
| 4,748,796 | 6/1988 | Viel | 53/411 |
| 4,755,245 | 7/1988 | Viel | 156/227 |
| 5,109,892 | 5/1992 | Somers | 141/11 |
| 5,112,552 | 5/1992 | Wittmann et al. | 264/255 |
| 5,160,686 | 11/1992 | Thaler et al. | 264/255 |
| 5,241,804 | 9/1993 | Tsuruta et al. | 53/504 |
| 5,257,491 | 11/1993 | Rouyer et al. | 53/248 |

FOREIGN PATENT DOCUMENTS

| | | |
|---|---|---|
| 17394 | 10/1980 | European Pat. Off. . |
| 469564 | 2/1992 | European Pat. Off. . |
| 521661 | 1/1993 | European Pat. Off. . |
| 0412867B1 | 9/1993 | European Pat. Off. . |
| 2544654 | 10/1984 | France . |
| 2601616 | 1/1988 | France . |
| 2603021 | 2/1988 | France . |
| 3234065 | 4/1983 | Germany . |
| 3138222 | 5/1983 | Germany . |
| 3327289 | 2/1985 | Germany . |
| 86 28 513 U | 1/1987 | Germany . |
| 87 10 132 U | 10/1987 | Germany . |
| 3625358 | 2/1988 | Germany . |
| 48-103635 | 12/1973 | Japan . |
| 2156302 | 10/1985 | United Kingdom . |

*Primary Examiner*—Mathieu D. Vargot
*Attorney, Agent, or Firm*—Ellen T. Dec

[57] ABSTRACT

A non-blocking hot melt adhesive mass is prepared by (a) lining a rigid mold with a plastic film, said film being meltable together with the adhesive composition and blendable into said molten adhesive composition, and said mold being a heat sink or being in contact with a heat sink; (b) pouring molten hot melt adhesive into the lined mold; and (c) allowing the molten hot melt adhesive to solidify.

11 Claims, No Drawings

METHOD FOR PACKAGING HOT MELT ADHESIVES

This application is a continuation of application Ser. No. 07/883,994, filed May 18, 1992, now abandoned.

This invention relates to a method for packaging hot melt adhesives compositions and to the resulting packaged adhesive compositions.

Hot melt adhesives which are generally applied while in the molten or liquid state are solid at room temperature. Typically, these adhesives are provided in the form of blocks and because of the nature of these materials, particularly the pressure sensitive hot melts, there are problems associated with handling and packaging them. The solid adhesive blocks not only stick or adhere to hands or mechanical handling devices and to each other, but they also pick up dirt and other contaminants. Additionally, certain applications which require high tack formulations result in blocks that will deform or cold flow unless supported during shipment. The need and advantages for providing tackless or non-blocking hot melt adhesives are apparent and various ways of accomplishing this have been developed.

Japanese Patent 48-103635 published Dec. 26, 1973 discloses a granular adhesive which is tacky at room temperature and coated or enveloped with a nontacky hot meltable material that is the same type or is miscible or mixable with it.

French Patent 2,544,654 published Oct. 26, 1984 discloses forming a tackless hot melt by adding molten hot melt to a mold containing a preformed support layer having a transfer film thereon which is compatible with the hot melt.

U.S. Pat. Nos. 4,748,796 issued Jun. 12, 1988 and 4,755,245 issued Jul. 5, 1988 disclose forming a protective coating for an adhesive material by electrostatically coating a mold or cavity with a powder screen and then pouring hot melt into the mold.

French Patent 2,601,616 published Oct. 22, 1988 discloses forming blocks of hot melt pressure sensitive adhesives by casting the pressure sensitive adhesive into molds precoated by spraying with a film of non self-sticking hot melt material thereby forming a fusible non-tacky veil around the pressure sensitive block.

In German Patent 22 48 046 the hot melt adhesive is squeeze-cut into pillow-shaped pieces; the pieces subsequently cooled and solidified.

Still other patents teach coating or wrapping the formed hot melt block with various types of plastic films. Thus, German patents DE 31 38 222 and 32 34 065 disclose coating the circumference of elongated hot melt portions with a thin polyolefin film. German patent 36 25 358 to Hausdorf teaches wrapping the solid hot melt block in a thermoplastic, especially copolyamide film with a melting point of 120° C. to 150° C., which EP application 0 469 564 to Rouyer et al. discloses wrapping the solidified hot melt in a plastic packaging material.

All the later methods have provided some degree of improvement in the packaging and handling of hot melt adhesives however they have suffered by virtue of either the need to unwrap or otherwise unpackage the hot melt or, in the cases of coated hot melts which are added directly to the melting pots, by virtue of the contamination resulting from the build up over time of large quantities of the packaging materials in the melt pot and application equipment.

In order to overcome the disadvantages inherent in the methods of the prior art, applicants have found that when the hot melt adhesive is poured in its molten state into a mold or cavity lined with plastic packaging film and then allowed to solidify, the adhesive is fused to some extent into the film, resulting in a non-blocking adhesive package which will melt faster in the melt pot and will not cause a build up of undesirable plastic residue even after extended periods of time. Thus, the intermolecular transfer of one or more of the hot melt components into the contact surface of the plastic film allows some mixing or compatibilizing of the film and the hot melt thereby improving the opportunity for more complete mixing of the hot melt and film when remelting of the packaged hot melt occurs. The method provides an additional benefit over prior non-blocking packages in that the package itself is air-tight allowing no air to be entrapped therein. The presence of entrapped air in prior packages has been blamed for a variety of problems including incomplete melting and blending of the packaging material into the adhesive whereby the packaging material floats on the surface of the hot melt and/or adheres to the walls of the melt pot.

Since the melting point of the plastic film must be comparable to, and preferably lower than, the melting point of the hot melt adhesive in order to provide for satisfactory melting in the melt pot which does not have a source of agitation, it is necessary that the lined mold be a heat sink or be in contact with a heat sink so as to remove excess heat from the film as quickly as possible and thereby prevent melting, burning or charring of the plastic film wrap.

Thus, the present invention is directed to a method for packaging hot melt adhesives comprising the steps of:

a. lining a mold with a plastic film, said film being meltable together with the adhesive composition and blendable into said molten adhesive composition, and said mold being in contact with a heat sink;

b. pouring the molten hot melt adhesive into the lined mold; and c. allowing the molten hot melt adhesive to solidify.

The method of the present invention is adaptable to the packaging of virtually any type of hot melt adhesive composition. It is especially adapted to the packaging of thermoplastic or thermosetting pressure sensitive adhesives where the handling problems are most severe. As examples the method disclosed herein may be used to package hot melt adhesives prepared from polymers and copolymers of synthetic resins, rubbers, polyethylene, polypropylene, polyurethane, acrylics, vinyl acetate, ethylene vinyl acetate and polyvinyl alcohol. More specific examples include hot melt adhesives prepared from the following:

a. rubber polymers such as block copolymers of monovinyl aromatic hydrocarbons and conjugated diene, e.g., styrene-butadiene, styrene-butadiene-styrene, styrene-isoprene-styrene, styrene-ethylene-butylene-styrene and styrene-ethylene propylene-styrene;

b. ethylene-vinyl acetate polymers, other ethylene esters and copolymers, e.g., etylene methacrylate, ethylene n-butyl acrylate and ethylene acrylic acid;

c. polyolefins such as polyethylene and polypropylene;

d. polyvinyl acetate and random copolymers thereof;

e. polyacrylates;

f. polyamides;
g. polyesters;
h. polyvinyl alcohols and copolymers thereof;
i. polyurethanes;
j. polystyrenes;
k. polyepoxides;
l. graft copolymers of vinyl monomer(s) and polyalkylene oxide polymers; and
m. aldehyde containing resins such as phenol-aldehyde, urea-aldehyde, melamine-aldehyde and the like.

Most often such adhesives are formulated with tackifying resins in order to improve adhesion and introduce tack into the adhesive. Such resin include, among other materials, (a) natural and modified resins, (b) polyterpene resins, (c) phenolic modified hydrocarbon resins, (d) coumarone-indene resins, (e) aliphatic and aromatic petroleum hydrocarbon resins, (f) phthalate esters and (g) hydrogenated hydrocarbons, hydrogenated rosins and hydrogenated rosin esters.

Desirable optional ingredients include diluents, e.g., liquid polybutene or polypropylene, petroleum waxes such as paraffin and microcrystalline waxes, polyethylene greases, hydrogenated animal, fish and vegetable fats, mineral oil and synthetic waxes as well as hydrocarbon oils such as naphthionic or paraffinic mineral oils.

Other optional additives may include stabilizers, antioxidants, colorants and fillers. The selection of components and amounts as well as the preparation thereof are well known in the art and described in the literature.

The thermoplastic film into which the molten adhesive is poured may be any film which is meltable together with the adhesive composition and blendable into said molten adhesive and which will not deleteriously affect the properties of the adhesive composition when blended therewith. Suitable thermoplastic materials include ethylene based polymers such as ethylene/vinyl acetate, ethylene acrylate, ethylene methacrylate, ethylene methyl acrylate, ethylene methyl methacrylate, high and low density polyethylene, polyethylene blends and chemically modified polyethylene, copolymers of ethylene and C 1-6 mono- or diunsaturated monomers, polyamides, polybutadiene rubber, polyesters such as polyethylene terephthalate, polybutylene terephthalate, etc.; thermoplastic polycarbonates, atactic poly-alpha-olefins, including atactic polypropylene; thermoplastic polyacrylamides, polyacrylonitrile, copolymers of acrylonitrile and other monomers such as butadiene, styrene, etc., polymethyl pentene, polyphenylene sulfide, aromatic .polyurethanes; styrene-acrylonitrile, acrylonitrile-butadiene-styrene, styrene-butadiene rubbers, polyethylene terephthalate, acrylonitritel-butadiene-styrene elastomes, polyphenylene sulfide as well as polyvinyl aromatic-rubber block copolymers.

The films may, if desired, contain antioxidants for enhanced stability as well as other optional components such as fatty amides or other processing aids, anti-stats, stabilizers, plasticizers, dyes, perfumes, fillers and the like.

The specific thermoplastic film utilized will depend, in large part, on the composition and melting point of the hot melt adhesive being packaged, with the softening point of the film generally being less than about 125° C. Particularly preferred for most hot melt adhesives are thermoplastic films of low density polyethylene or polyethylene vinyl acetate wherein the amount of vinyl acetate is 0 to 10%, preferably 3 to 5%, by weight. Especially preferred are such films having a melt flow index of 0.5 to 10.0; a softening point of 100° C. to 120° C. and a specific gravity of 0.88 to 0.96. One example of these films is available commercially from Armin Polyfilm under the Armin 501 trade name.

The thickness of the film utilized generally varies between about 0.1 mil to 5 mil, preferably 0.5 mil to 4 mil. It is further preferred that the thermoplastic film comprise not more than about 1.5% by weight of the total adhesive mass and that it optimally vary from 0.2 to 1.0% by weight of the mass in order to prevent undue dilution of the adhesive properties.

The mold into which the thermoplastic film is placed and into which the molten adhesive is to be poured may comprise any rigid, self supporting material. The molds are generally formed from rigid plastic, e.g., acrylonitrile/butadiene/styrene polymers or polypropylene or from metallic substrates. The size of the mold varies according to the size of the desired hot melt adhesive block. In general each mold is approximately 3"×3"×11" in dimension and often a series of molds are formed from one contiguous plastic, cellulosic or metal sheet.

The heat sink which is critical to the success of the method of the present invention may comprise any means which will effectively and rapidly remove or absorb the excess heat from the film in contact with the molten hot melt adhesive composition so as to prevent the temperature of the film from exceeding its melting point even though the molten hot melt adhesive temperature is higher than the film melting temperature. Suitable heat sinks are provided by contacting the mold with a refrigerant gas or liquid environment as, for example, by placing a metal mold directly on the surface of a cooled water or other liquid bath. A preferred heat sink is prepared by lining the plastic or metal mold with a flexible wetted absorbent substrate prior to inserting the thermoplastic film lining. Suitable flexible substrates may be formed from sponge, cellulosic or felt material having a thickness, when wetted, of about 1/16" to ½". In these cases, the substrate may be wetted with any suitable liquid including water as well as other organic refrigerant solvents provided the solvents do not attack the plastic film. In an alternative embodiment, the heat sink may be provided by forming the actual mold from a cellulosic substrate. In the latter embodiment, the cellulose forms the dual role of being the molding material as well as the absorbent substrate. In such cases, it is necessary that the cellulosic sheeting have sufficient rigidity in order to form a mold as well as that it be thick enough to absorb enough water or other liquid to perform as a heat sink. Cellulose thicknesses of about 1/8 to ½ inch or more have been found useful.

The molten adhesive is generally poured into the lined mold at a temperature of about 140° C. and allowed to solidify in the mold prior to removal therefrom. The time required for solidification will vary depending upon the temperature of the cooling environment as well as the volume of hot melt present in the mold.

The upper surface of the non-blocking adhesive package may be treated in a variety of ways. Sufficient plastic film may initially be placed in the mold to overlap the sides of the mold and the overlapped portion then folded over the hot melt either while it is molten or after solidification in which case a secondary seal may be formed as by heat welding. Alternatively, the upper surface may be left uncovered and the uncovered portions of two adhesive blocks may then be placed in contact with each other to form one double non-blocking adhesive package.

The resultant individually packaged hot melt adhesive blocks can be stored, handled and used without any problems of the individual blocks sticking together, adhering to other objects, or becoming contaminated even if exposed to increased pressure and/or temperature. When it is desired to ultimately utilize the adhesive, the entire wrapped block is added to the melt pot. As an advantage of the present method, the fact that the adhesive had been poured into the lined mold in its molten form created some degree of fusion between the adhesive and the film. Because of this fusion, very little additional energy is required to melt and blend the film into the adhesive itself. Further, the absence of any entrapped air results in a homogeneous melting of the adhesive with no plastic film undesirably separating from the adhesive block and floating to the surface and/or sides of the melting pot.

The thus packaged hot melt adhesive block may, of course, additionally be packaged in a second outer container to further reduce its exposure to the environment, moisture or other contaminants. The secondary wrappings would then be removed by conventional procedures prior to utilization of the hot melt adhesive.

EXAMPLE

A conventional pressure sensitive hot melt adhesive composition was prepared from a styrene-butadiene-styrene block copolymer, tackifier and plasticizer.

A series of plastic molds, each 3"×3"×11", formed from a contiguous sheet of rigid acrylonitrile/butadiene/styrene plastic was lined with flexible absorbent sheeting of thickness 3/16" which had been previously saturated with room temperature water. Thereafter, a plastic film comprising an ethylene vinyl acetate copolymer containing 4% vinyl acetate (Armin 501— melt temperature 110° C.) was used to line the mold and the molten (140° C.) hot melt adhesive poured therein. The molds were allowed to cool to room temperature to solidify the adhesive. The plastic coated adhesive blocks were then added to a melt pot, remelted at 150° C. and used to bond polyethylene to nonwovens in a disposable diaper construction. The resulting bond was comparable in adhesion properties to bonds made with the same hot melt adhesive (control) which had not been previously coated as shown from the results presented in Table 1.

Test Procedures

Adhesive Strength: The adhesion to stainless steel and to Mylar (polyester) film was measured by peeling the tape backing over itself 180° C. at a constant speed (by a force applied to the free end of the tape) from a smooth steel surface or HDPE to which it has been applied by a fixed pressure. For the techniques used in conducting this test, see the 180° peel adhesion test PSTC-1 of the Pressure Sensitive Tape Council. This test can be performed only on adhesive formulations which are pressure sensitive and is a measure of the strength or tenacity of the adhesive.

Loop Tack: Loop tack is measured by means of a loop tack tester (Testing machines, Inc., Amityville, N.Y.). The latter records the force, measured in ounces, to remove a one-inch by five-inch adhesive coated test strip, formed in the shape of a loop, from a polyethylene substrate having one square inch of contact. The results presented are the average of three tests.

TABLE 1

| Test | Control | Coated Sample |
|---|---|---|
| Adhesive Strength (initial) | 3.9 lb/linear inch | 4.0 lb/linear inch |
| Loop Tack (initial) | 35.0 oz/in$^2$ | 37.2 oz/in$^2$ |
| Adhesive Strength (aged*) | 5.4 lb/linear inch | 4.9 lb/linear inch |
| Loop Tack (aged*) | 39.3 oz/in$^2$ | 40.8 oz/in$^2$ |

*Aged tests were performed after the adhesives had been aged for 72 hours at 350° F.

Similar results were obtained when a styrene-ethylene-butylene-styrene based pressure sensitive hot melt adhesive was thus packaged and subsequently remelted and used as a positioning adhesive as shown by the test results presented in Table 2.

Test Procedures:

Dynamic Cotton Shear: The coated samples were laminated to cotton knit fabric (placed on glass) using two passes with a 4.5 lb. (2 kg) roller. Immediately after lamination, the coated sample was pulled from the cotton knit using the shear mode on an Instron Tester at a crosshead speed of 20 inches (50 cm) per minute. values shown are for an average of at least three samples and are expressed in grams per linear inch.

180° Cotton Peel: The coated sample was laminated to cotton knit fabric by placing the knit on glass plates in an oven equilibrated to 40° C. and placing the sample on top of the knit with a load of 150 grams per square inch for a period of 60 minutes. The sample was then peeled away from the cotton knit in a 180° direction using an Instron Tester at crosshead speed of 20 inches (50 cm) per minute. Values shown are for an average of at least three samples and are expressed in grams per linear inch.

Cotton Peel Retention: The coated sample was laminated to cotton knit as for the Dynamic Shear Test. Then using a crosshead speed of 20 inches (50 cm) per minute, the coated samples were pulled away from the cotton knit immediately and after 30 minutes conditioning at room temperature. Values are shown in grams per linear inch for an average of at least three samples at each time interval.

Transfer: The coated sample was laminated to cotton knit fabric by placing the knit on glass plates in an oven equilibrated to 49° C. and laminating with a 800 gram per square inch load for 24 hours. The sample was then peeled away from the cotton knit in 180° direction on an Instron tester at crosshead speed of 20 inches (50 cm) per minute. Values shown are for an average of at least three samples and are expressed in grams per linear inch. The adhesive residue left on the cotton knit is noted qualitatively.

TABLE 2

| Test | Aged 1 month in constant temperature humidity | | Aged 1 month in 120° F. | |
|---|---|---|---|---|
| | Control | Coated Sample | Control | Coated Sample |
| Shear | 4750 | 4400 | 3350 | 3267 |
| Peel | 217 | 200 | 217 | 213 |
| Peel Retention | | | | |
| Initial | 509 | 492 | 292 | 288 |
| ½ hour | 254 | 250 | 238 | 230 |
| % Change | −50.1% | −49.2% | −18.5% | −20.1% |
| Transfer | 608/N.T. | 617/N.T. | 475/N.T. | 442/N.T. |

N.T. = No transfer

The results of the above tests show that the adhesive properties of the adhesive blocks are unaffected by the admixture with the packaging material. Similar results would also be obtained when packaging other hot melt adhesive formulations.

We claim:

1. A method for packaging hot melt adhesive compositions comprising the steps of:
    a. lining a rigid mold with a single layer of a thermoplastic film selected from the group consisting of ethylene/vinyl acetate, ethylene acrylate, ethylene methacrylate, ethylene methyl acrylate, ethylene methyl methacrylate, high density polyethylene, low density polyethylene, copolymers of ethylene and C. 1-6 mono- or diunsaturated monomers, blends thereof, polyamides, polybutadiene rubber, polyesters, polycarbonates, atactic poly-alpha-olefins, thermoplastic polyacrylamides, polyacrylonitrile and copolymers thereof, polymethyl pentene, polyphenylene sulfide, aromatic polyurethanes, sytrene-acrylonitrile, acrylonitrile-butadiene-styrene, styrene-butadiene rubbers, polyethylene terephthalate, polyphenylene sulfide and polyvinyl aromatic-rubber block copolymers, said film being meltable together with the adhesive composition and blendable into said molten adhesive composition upon subsequent use, and said mold being in contact with a refrigerant gas or liquid heat sink;
    b. pouring molten hot melt adhesive into the lined mold at a temperature above the melting point of the thermoplastic film thereby creating some degree of fusion between the adhesive and the plastic film while the refrigerant gas or liquid heat sink serves to prevent the plastic film from melting or deteriorating; and
    c. allowing the molten hot melt adhesive to solidify so as to form a packaged hot melt adhesive.

2. The method of claim 1 wherein the rigid mold is formed from an acrylonitrile/butadiene/styrene polymer or polypropylene.

3. The method of claim 1 wherein the rigid mold is formed from a metal substrate.

4. The method of claim 1 wherein the rigid mold is formed from a wetted cellulosic substrate which also forms the heat sink.

5. The method of claim 1 wherein the hot melt adhesive is a pressure sensitive hot melt adhesive.

6. The method of claim 1 wherein the plastic film is a low density polyethylene or a polyethylene vinyl acetate polymer containing up to 10% by weight vinyl acetate.

7. The method of claim 1 wherein the plastic film is present in an amount of 0.2 to 1.0% by weight of the adhesive mass.

8. The method of claim 1 wherein the rigid mold is metal and the heat sink is provided by placing the metal mold in a refrigerated liquid bath.

9. The method of claim 1 wherein the heat sink is provided by lining the interior of the mold with a flexible wetted absorbent substrate.

10. The method of claim 9 wherein the absorbent substrate comprises a cellulosic, sponge or felt material.

11. The method of claim 1 comprising the additional step of placing upper unlined surfaces of two solidified adhesive blocks in direct contact with each other so as to form a double non-blocking adhesive mass.

* * * * *